United States Patent [19]

Morse

[11] Patent Number: 5,073,205
[45] Date of Patent: Dec. 17, 1991

[54] METHOD FOR DETACKIFICATION OF PAINT STRAY OPERATION WASTES

[75] Inventor: Lewis D. Morse, Pittsburgh, Pa.

[73] Assignee: Merck & Co., Inc., Rahway, N.J.

[21] Appl. No.: 694,701

[22] Filed: May 2, 1991

[51] Int. Cl.$^5$ .......................... B08B 3/04; B08B 3/08
[52] U.S. Cl. ...................................... 134/38; 210/712;
210/732; 252/181; 252/174.23; 526/304
[58] Field of Search .................. 134/38; 210/712, 732;
252/181, 174.23; 526/304

[56] References Cited

U.S. PATENT DOCUMENTS 4,686,047  8/1987  Arots ................................. 210/712
4,895,658  1/1990  Amjad ........................... 252/174.23

*Primary Examiner*—Theodore Morris
*Assistant Examiner*—Zeinab El-Arini
*Attorney, Agent, or Firm*—Raymond M. Speer; Hesna J. Pfeiffer

[57] ABSTRACT

An improved method for detackifying over-sprayed paint, lacquer or enamel entrained in the circulating water of paint spray booths comprises maintaining in the wash water a small amount of an N-methylolacrylamide copolymer with methyldiallylamine.

4 Claims, No Drawings

METHOD FOR DETACKIFICATION OF PAINT STRAY OPERATION WASTES

BACKGROUND OF THE INVENTION

Automobile parts, bicycles, toys, appliances and other industrial and consumer articles are conventionally spray painted in areas called spray booths wherein water curtains are employed to wash the air and to remove over-sprayed paint, lacquer or enamel solids. The wash water is then treated to remove paint solids, and the treated water is recirculated.

A water curtain is typically created by pumping water into a trough above the overspray area. The overflow from the trough is then controlled so that a uniform sheet of water falls along the length of the trough and down the booth's wall. Spray nozzles are also commonly used. Droplets of oversprayed paint, emitted by a spray gun, contact and are captured by the water curtain.

A major problem associated with spraying operations concerns the tacky or adhesive nature of the oversprayed coating materials. Solids tend to agglomerate and accumulate on the walls, ceiling and floor of the spray area and to clog water spray equipment, recirculating pumps and the like. Paint that sticks to spray booth surfaces usually cannot be easily removed from the equipment and tends to build up overtime, which hampers spray booth efficacy. Thus, the overspray, or paint mist, captured in the water system of a spray booth must be detackified, or "killed", before it adheres to the walls, piping, etc. of the spray booth.

The term "paint killing", as used herein, refers to the act of detackifying oversprayed paint in paint spray booths.

"Paint", as used herein, is a generic term which encompasses all common varieties of water insoluble coatings commonly applied in spraying operations, including but not limited to oil base paints, enamels and lacquers. These products, if untreated, readily adhere to the walls of spray booths and any other surface that they contact, such as the surfaces of water distribution piping, spray nozzles etc.

One solution which has been found to have practical application to the problem involves the use of chemicals which, when added to spray booth water, detackify paint solids. A wide, variety of chemicals have been proposed for this purpose, including compositions containing polymers and multi-valent metal salts which form insoluble hydroxides at pH's greater than about 7. The use of combinations of this type are described in U.S. Pat. Nos. 3,861,887 to Forney; 3,990,986 to Gabel et al; 4,002,490 to Michalski et al; 4,067,806 to Mauceri; 4,130,674 to Roberts et al; 4,440,647 to Puchalski and 4,600,513 to Mizutani et al. Further, U.S. Pat. No. 4,637,824 to Pominville discloses the use of silicates and polydiallyldialkylammonium halides with amphoteric metal salts, and U.S. Pat. No. 4,853,132 to Merrell et al discloses the use of precipitates formed by the reaction of cationic polymers and salts of inorganic anions to detackify solvent-based paints. Compositions comprising alkaline zinc solutions are described in U.S. Pat. No. 4,880,471 to Kaiser. Compositions containing a polymer and water-swellable clay are disclosed in U.S. Pat. No. 4,629,572 to Leitz et al. Methods utilizing melamine-aldehydes are described in U.S. Pat. No. 4,656,059 to Mizuno et al. Methods utilizing melamine-formaldehyde and styrene-acrylate are described in U.S. Pat. No. 4,764,561 to Kiss et al. Formulations comprising a carnauba or raw montan wax, an amine and an antifoam have also been utilized, as described in U.S. Pat. No. 4,687,520 to Seng.

While these compositions are generally effective in detackifying and removing paint over-spray, a need exits for water-based, stable alkaline compositions which have high efficiency in order to increase productivity and to achieve a high degree of effectiveness for all types of paints and particularly solvent-borne paints, lacquers and enamels.

DETAILED DESCRIPTION OF THE INVENTION

The instant invention relates to the use of copolymers of N-methylolacrylamide and methyldiallylamine ("poly (MDAA/N-MAM)") as detackifiers of solvent-borne paints.

The copolymers of N-methylolacrylamide and methyldiallylamine are effective and efficient detackifiers for or solvent-borne paints, lacquers and enamels and their effectiveness and efficiency are not dependent on the presence of added multi-valent metal salts.

More particularly, the present invention relates to an improved method for detackifying over-sprayed paint entrained in the circulating water of water wash paint spray booths. The improvement comprises adding to the water being circulated in a paint spray booth operation an effective amount, for the purpose of detackifying the over-sprayed paint, lacquer or enamel, of a copolymer of N-methylolacrylamide and methyldiallylamine.

Thus, the instant invention additionally relates to paint-detackifying compositions comprising a copolymer of N-methylolacrylamide and methyldiallylamine.

The preferred resins of this invention can be prepared by polymerizing the hydrohalide salt of methyldiallylamine with N-methylolacrylamide in the presence of ethylene bis(oxyethyleneitrilo)-tetraacetic acid and 2,2'-azobis(2-aminopropane)-dihydrochloride. Methods of preparation known in the art may also be utilized. See, for example, the methods set forth in U.S. Pat. No. 4,749,759, issued June 7, 1988.

Use of the copolymers of N-methylolacrylamide and methyldiallylamine as detackifiers for paint spray operation waters is typically carried out by adding an aqueous solution of the resin to fresh or recirculated water at a convenient location in the system being treated, such as at a sump, upstream from the pumps or at any advantageous location in the recirculation system, but preferably before the water enters the spray area circuit of the system being treated. The poly(MDAA/N-MAM) mixture can be applied intermittently or continuously to the water system being treated. Since spraying is generally continuous, continuous addition of the poly(MDAA/N-MAM) mixture is preferred. The poly(MDAA/N-MAM) mixture may be added at any convenient location, but is preferably added so as to allow the maximum concentration of poly(MDAA/N-MAM) to contact the over-sprayed paint(s). For example, the poly(MDAA/N-MAM) mixture may be added to a line supplying the trough or other device used to form the water curtain. Multiple points of addition may be used. In a typical paint spray booth operation, the return water from the booth generally encounters extreme turbulence. This turbulence improves the efficacy of the treatment by promoting intimate contact between the paint and the copolymer of N-methylolacrylamide and methyldiallylamine.

Since under normal conditions spray operation water will usually have a pH of at least 6, pH adjustment is not generally necessary unless the resin is in its acid stabilized form. However, if the pH of the water falls below about 6, adjustment is necessary and can be conveniently carried out by adding an alkaline pH control agent such as an alkali metal hydroxide, carbonate, bicarbonate, silicate and the like. The pH range which provides maximum operating efficiency with the resins of the invention is about 8 to 13.

An effective amount of the instant copolymer of N-methylolacrylamide and methyldiallylamine should be added to the spray booth water system. As used herein, the term "effective amount" is that amount which is sufficient to reduce the tackiness of paint, lacquer or enamel solids and to condition the solids so that they can readily be separated from the water, as for example by decantation or filtration, and the water can be recycled to the operation. Since the amount of paint contacting a water curtain varies depending on a number of variables, including plant or process shutdowns, the size of the items being painted, spraying techniques, waterflow rate and the type of paint being used, the amount of paint that is captured can vary considerably. Under normal conditions the dosage level is within the range of 1 to 50,000 ppm (based on active resin solids), preferably 2 to 40,000 ppm and most preferably 5 to 30,000 ppm.

In general, the copolymer of N-methylolacrylamide and methyldiallylamino, poly(MDAA/N-MAM), mixture should be added to the water being treated in a preferred dosage of from between about 0.001 to about 1.0 part poly(MDAA/N-MAM) (active basis) per part paint, most preferably between about 0.01 and about 0.5 part poly(MDAA/N-MAM) per part paint. The alkalinity adjustment and poly(MDAA/N-MAM) addition steps may be carried out simultaneously, noting, however, that alkalinity adjustment and poly(MDAA/N-MAM) addition both occur prior to contact between the over-sprayed paint and the circulated paint spray booth water. The key factor is that the over-sprayed paint contact water within the desired alkalinity range which already contains an effective amount of a poly(MDAA/N-MAM).

As indicated above, this practice of this invention does not require the presence of salts of multi-valent metals which form insoluble hydroxides at pH values greater than about 7 or other additives to achieve high performance and efficiency. Such additives, however, have not been found to detract from the advantages realized by this invention and may under exceptional conditions provide marginal improvement with certain custom spray formulations. Typical water-soluble salts of multi-valent metals of this type include the salts of zinc, iron, aluminum, calcium, magnesium, manganese, tin and the like. The preferred metal salts are zinc chloride, aluminum chloride, aluminum sulfate, ferric chloride, ferric sulfate, calcium chloride, magnesium chloride and magnesium sulfate. Additionally, it may be desirable under certain conditions to include one or more surfactants which act as frothing agents or wetting agents for the solids, defoamers for the system, or the like. The preferred surfactants are compatible with the system and are non-ionic low molecular weight polyethers derived from polyalkylene oxides and particularly polymers containing ethylene oxide and propylene oxide units, the polyoxyethylene glycols and the polyoxypropylene glycols. When salts of multi-valent metals and/or surfactants are used, the amount of each will usually range from 0.001 to 10% and preferably will be from 0.002 to 2.5% based on the amount of water.

After oversprayed paint, lacquer or enamel contacts the copolymer of N-methylolacrylamide and methyldiallylamine, a polymeric flocculant may be added to the paint spray booth water system. The flocculant promotes the formation of a buoyant floc structure by binding the conditioned paint particles and incorporating air into the floc structure. The resulting floating floc facilitates the removal of paint solids from the circulating water system.

Suitable polymeric flocculants comprise at least one nonionic polymer, at least one anionic polymer, at least one cationic polymer, at least one amphoteric polymer, or a mixture thereof. Nonionic polymeric flocculants are preferred. Generally, polymeric flocculants having weight average molecular weights of at least $2 \times 10^6$ are preferred. Preferably, the molecular weight should exceed about $6 \times 10^6$. Examples of flocculants include long chain polymethacrylamides. More preferably, the flocculants are nonionic polyacrylamides having a weight average molecular weight ranging from about $6 \times 10^6$ to about $20 \times 10^6$.

Typical cationic polyelectrolytes which may be used as flocculants in the instant invention include but are not limited to polyamines, polyphosphonium compounds, polysulfonium compounds, quaternary ammonium compounds, polymers of methacryloyloxyethyl trimethyl ammonium methyl sulfate (METAMS), polymers of methacrylamido propyl trimethyl ammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methyacrylamide. Representative of quaternary ammonium compounds are diethyldiallyl ammonium and dimethyldiallyl ammonium polymers and salts thereof.

The preferred cationic flocculants are quaternary ammonium polymers such as polydimethyldiallyl ammonium chloride (polyDMDAAC), polydimethyldiallyl ammonium bromide (polyDMDAAB), polydiethyldiallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculant is a copolymer comprising acrylamide and dimethyl diallyl ammonium chloride or a homologue thereof, having a weight average molecular weight in excess of about 4,000,000.

Other preferred polymers comprise: a) acrylamide or methacrylamide and b) METAMS, METAC, MAPTAC or AETAC, wherein the monomer ratio of a):b), on an active weight basis, is greater than about 1:1.

Preferred anionic flocculants are composed of polymers of 2-methacrylamido-2-methylpropylsulfonic acid and salts thereof, and copolymers of a) acylic acid and/or methacrylic acid and b) 2-acrylamido-2-methylpropylsulfonic acid and/or 2-methacrylamido-2-methylpropylsulfonic acid. Hydrolyzed polyacrylamides may also be used. The preferred anionic polyelectrolytes possess a low charge (i.e., less than 2%) and are selected from the group consisting of polyacrylic acids and salts thereof, particularly sodium salts thereof, having a molecular weight ranging from about $2 \times 10^6$ to about $20 \times 10^6$, hydrolyzed polyacrylamides having virtually any degree of hydrolysis and molecular weights ranging from about $2 \times 10^6$ to about $20 \times 10^6$, and polymers comprising a) acrylic acid or methacrylic acid and b) 2-acrylamido-2-methylpropylsulfonic acid and/or 2-methacrylamido-2-methylpropylsulfonic acid, wherein the weight ratio of a):b) range from about 1:99 to about 99:1, preferably 10:90 to 90:10 and most preferably 75:25, and wherein the molecular weight ranges from about $2 \times 10^6$ to about 20 to $10^6$.

Certain high molecular weight polyampholytes can also be used in the instant method. Representative examples of suitable polyampholytes include polymers comprising a) acrylic acid, methacrylic acid, 2-acrylamido-2-methylpropylsulfonic acid or 2-methacrylamido-2-methylpropylsulfonic acid, alone or in combination, and b) dimethyldiallyl ammonium chloride, dimethyldiallyl ammonium bromide, diethyldiallyl ammonium chloride or diethyldiallyl ammonium bromide, alone or in combination, wherein the weight ratio of component a) to component b) ranges from about 90:10 to about 10:90 and wherein the polyampholyte has a molecular weight in excess of about $2 \times 10^6$. The polyampholytes may also contain nonionic moieties such as acrylamide or methacrylamide.

Blends of the above listed nonionic, cationic, anionic and polyampholyte flocculants can be used, alone or in combination with amphoteric metal salts.

An effective amount of the polymeric flocculant should be added. The effective amount depends upon the quantity of copolymer of N-methylolacrylamide and methyldiallylamine present in the system being treated. Preferably, the effective flocculant dosage will range from about 0.01 to about 150 parts (active basis) of the polymeric flocculant per part copolymer of N-methylolacrylamide and methyldiallylamine (active basis) and more preferably, 0.1 to 20 parts, on an active polymer:active polymer basis.

The function of the polymeric flocculant is two-fold: it reacts with the polymer treated paint solids to form a large, buoyant, easily-captured floc, and it reduces or totally eliminates foam formation in the system by removing colloidal particulates present in the water.

It is preferable that the flocculant be added to the paint spray booth water after the over-sprayed, water-borne paint is contacted with the paint spray booth water and polymer. Once the polymer-treated paint solids have been contacted with at least one polymeric flocculant, the resulting sludge is removed from the water. This removal may be facilitated by any means known in the art, including, but not limited to, air flotation and filtration.

Other additives commonly used for the treatment of water containing oversprayed paint may be used in conjunction with the instant method. For example, bentonite clays, carbon black, talc, gums starch, dextrin, lime, aluminum oxide, silica solids, and casein among other additives, may be used as additional process aids in conjunction with the primary steps of the instant method. Additives from the class of amphoteric metal salts, including, but not limited to, alum, aluminum chloride, ferric sulfate and ferric chloride, can also be used to enhance the performance of the instant invention.

The following examples are given for the purpose of illustrating the present invention and shall not be construed as being limitations on the scope or spirit of the instant invention. Unless otherwise specified, reference to percentage or parts are by weight.

EXAMPLE 1

Preparation of Poly(MDAA.HCl/N-MAM) 1:4 Molar Ratio

To 7.72 g chilled concentrated hydrochloric acid was added dropwise with stirring and chilling 8.62 g methyldiallylamine (MDAA). This was added with stirring to 0.17 g tetrasodium EDTA dissolved in 278.35 g D.I. water. The pH of the system was 2.4. The monomer/EDTA solution was charged to a kettle fitted with reflux condenser, stirrer, thermometer, feed lines and oil bath, and heated to reflux with stirring. 2,2'-Azobis(2-amidinopropane)-dihydrochloride (1.55 g) dissolved in 35.87 g D.I. water was fed to the refluxing system with stirring over 3 hours via Sage pump. Starting simultaneously with the initiator feed, 67.72 g 46.34% aqueous N-methylolacrylamide was fed over 2 hours at 1.130 g/min. for 30 minutes, followed by 0.376 g/min. for 90 minutes. The batch was held at reflux with stirring for 1 hour after finishing initiator feed.

The final product was light chartreuse, with a Brookfield viscosity of 20 cps and a pH of 4.3.

EXAMPLE 2

A copolymer was prepared as in Example 1, but dimethyldiallylammonium chloride (DMDAAC) was used in place of MDAA.HCl to yield poly(DMDAAC/N-MAM) 1:4 molar ratio.

EXAMPLE 3

A polymer was prepared as in Example 1, but the MDAA.HCl was replaced with water to yield poly(N-MAM).

EXAMPLE 4

A copolymer was prepared as in Example 1, but feeding an aqueous blend of acrylamide (AM) and N-MAM to a heel to yield poly(AM/N-MAM) 1:4 molar ratio.

EXAMPLE 5

The polymers of Examples 1-4 were evaluated via a jar test for paint kill, paint dispersion, and capability of forming floc. The jar test consisted of stirring vigorously with a magnetic stirring bar 200 ml cold tap water, made alkaline with 0.1% sodium carbonate. Paint kill polymer was added to make it 0.04% in the 200 ml tap water. Then six drops of a PPG white enamel, automobile paint was added and stirred for ½ minute. The stirring was stopped to see if the paint was well-dispersed, sticky or smeary. Stirring was resumed, 0.4 ml of a floccing agent [poly(AM/DMDAAC)70/30 w/w, 1% active] added, and stirring continued for a ½ minute to note if the paint flocced. Some of the paint was squeezed between the thumb and forefinger. With proper paint kill, there was neither stickiness nor paint smear on the fingers.

Observations were as follows:

| Example # | Composition | Jar Test |
|---|---|---|
| 1 | Poly(MDAA.HCl/N-MAM) 1:4 | Paint kill; well dispersed paint droplets that form a floating floc with poly(AM/DMDAAC). |
| 2 | Poly(DMDAAC/N-MAM) 1:4 | Paint kill and dispersion but no floc with poly(AM/DMDAAC). |
| 3 | Poly(N-MAM) | No paint kill; no dispersion. |
| 4 | Poly(AM/N-MAM) 1:4 | No paint kill; no dispersion. |

Poly(N-MAM) was ineffective in paint kill and as a dispersant. Spacing with acrylamide at a 1:4 ratio did not help. High levels of an anchoring methylol group, along with a secondary or tertiary amine moiety for dispersion, will give an effective paint kill.

While the foregoing specification teaches the principles of the present invention, with examples provided for the purpose of illustration, it will be understood that the practice of the invention encompasses all of the casual variations, adaptations, modifications, deletions, or additions of procedures and protocols described herein, as come within the scope of the following claims and its equivalents.

What is claimed is:

1. A method for detackifying over-sprayed paint which contacts and is captured by water circulating in a paint spray booth operation, which comprises adding to said circulating water an effective amount of a copolymer of N-methylolacrylamide and methyldiallylamine to reduce the tackiness of paint, lacquer or enamel solids and to condition the solids so that they can readily be separated from the water.

2. The method of claim 1, wherein said effective amount is 1 to 50,000 ppm.

3. The method of claim 1, wherein said effective amount is 2 to 40,000 ppm.

4. The method of claim 1, wherein said effective amount is 5 to 30,000 ppm.

* * * * *